(12) United States Patent
Stegmeier (10) Patent No.: US 9,266,446 B2
(45) Date of Patent: Feb. 23, 2016

(54) BELT RETRACTOR FOR A MOTOR VEHICLE SAFETY BELT

(71) Applicant: TRW Automotive GmbH, Alfdorf (DE)

(72) Inventor: Michael Stegmeier, Schwäbisch Gmünd (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/398,495

(22) PCT Filed: May 2, 2013

(86) PCT No.: PCT/EP2013/001300
§ 371 (c)(1),
(2) Date: Nov. 3, 2014

(87) PCT Pub. No.: WO2013/167247
PCT Pub. Date: Nov. 14, 2013

(65) Prior Publication Data
US 2015/0107924 A1    Apr. 23, 2015

(30) Foreign Application Priority Data
May 9, 2012   (DE) .......................... 10 2012 009 081

(51) Int. Cl.
| B60R 21/00 | (2006.01) |
| B60N 2/28 | (2006.01) |
| B60R 22/36 | (2006.01) |
| B60R 22/34 | (2006.01) |
| B60R 22/28 | (2006.01) |

(52) U.S. Cl.
CPC .......... *B60N 2/2806* (2013.01); *B60R 22/3413* (2013.01); *B60R 22/36* (2013.01); *B60N 2002/2815* (2013.01); *B60R 2022/283* (2013.01); *B60R 2022/287* (2013.01); *B60R 2022/288* (2013.01)

(58) Field of Classification Search
USPC ................ 180/268; 280/805, 807; 242/379.1, 242/383.1, 383.4, 384.1
See application file for complete search history.

(56) References Cited

U.S. PATENT DOCUMENTS

| 5,823,570 A * | 10/1998 | Lane, Jr. ............. | B60R 22/3413 188/375 |
| 6,416,006 B1 * | 7/2002 | Huber ................. | B60R 22/3413 242/379.1 |

(Continued)

FOREIGN PATENT DOCUMENTS

| DE | 19927427 | 1/2001 |
| DE | 10036933 | 2/2002 |

(Continued)

*Primary Examiner* — Toan To
(74) *Attorney, Agent, or Firm* — Tarolli, Sundheim, Covell & Tummino LLP (57) ABSTRACT

A belt retractor for a vehicle seat belt includes a rotatably supported belt reel (12) from which webbing can be unwound, a force limiting means which in a force limiting phase permits controlled webbing extension in the webbing extension direction when the belt reel (12) is blocked and a particular force threshold is exceeded, and a change-over device for carrying out a change-over operation before and/or during the force limiting phase in which it is changed from a first force level to a second force level. The change-over device includes a control means adapted to trigger or inhibit the change-over operation at least in response to the recognition of an installed child safety seat (34).

9 Claims, 6 Drawing Sheets

(56) References Cited

U.S. PATENT DOCUMENTS

| | | | |
|---|---|---|---|
| 6,616,081 B1 | 9/2003 | Clute et al. | |
| 6,863,235 B2* | 3/2005 | Koning | B60R 21/04 242/379.1 |
| 9,010,672 B2* | 4/2015 | Bedak | B60R 22/3413 242/379.1 |
| 2002/0014767 A1 | 2/2002 | Class et al. | |
| 2003/0160670 A1 | 8/2003 | Haas et al. | |
| 2004/0262441 A1* | 12/2004 | Hiramatsu | B60R 22/28 242/379.1 |
| 2005/0284978 A1* | 12/2005 | Zolkower | B60R 22/3413 242/382.4 |
| 2006/0011764 A1* | 1/2006 | Inagawa | B60R 22/3413 242/382 |
| 2008/0116310 A1 | 5/2008 | Bedak et al. | |
| 2010/0155519 A1 | 6/2010 | Moedinger et al. | |

FOREIGN PATENT DOCUMENTS

| | | |
|---|---|---|
| DE | 10307430 | 7/2004 |
| DE | 102006019270 | 10/2007 |
| DE | 102007026128 | 5/2008 |
| DE | 102008063639 | 6/2010 |
| DE | 102009003629 | 9/2010 |
| EP | 1104721 | 6/2001 |
| WO | 2007/003471 | 1/2007 |
| WO | 2008/063999 | 5/2008 |

* cited by examiner

BELT RETRACTOR FOR A MOTOR VEHICLE SAFETY BELT

RELATED APPLICATIONS

This application corresponds to PCT/EP2013/001300, filed May 2, 2013, which claims the benefit of German Application No. 10 2012 009 081.1, filed May 9, 2012, the subject matter of which are incorporated herein by reference in their entirety.

BACKGROUND OF THE INVENTION

The invention relates to a belt retractor for a vehicle seat belt. The invention further relates to a vehicle occupant protection device comprising said belt retractor.

For mounting a child safety seat in a vehicle, apart from the conventional mounting by means of a seat belt, mounting systems have established in which a rigid connection between the body of the vehicle and the child safety seat is produced. These systems are known especially under the designation Isofix which originates from the standardization according to the standard ISO 13216.

Various devices are known for detecting the installation of a child safety seat which is mounted in the vehicle by means of an Isofix or similar system.

DE 100 36 933 A1 illustrates such detection device which is fastened in pairs via mounting means to the mounting brackets fixed to the vehicle for the child safety seat. A fixed part of the device includes a magnetic switch element and a magnet for providing a magnetic actuating field for the switch element. A movable mechanism is moved from a first position to a second position during installation of the child safety seat by inserting a pair of locking means into the mounting brackets. In this way the magnetic actuating field is influenced so that the magnetic switch element changes its switching state. Thus a signal is switched for providing the airbag control of the vehicle with the information to deactivate the airbag deployment for this seat.

From DE 10 1009 003 629 629 A1 a seat anchoring element for child safety seats is known which can be fixed by fixing elements protruding at the rear to cross bolts in the backrest of a vehicle seat or to the vehicle body. Sensors in the form of micro switches which are electrically cable-connected to a signal means are allocated to the fixing elements. The signal means signals the secured mounting of the seat anchoring element by an acoustic element or by signal diodes.

A child safety seat including an electrically monitored locking mechanism for detecting faulty mounting of the child safety seat on a vehicle seat is known from WO 20081063999 A2. A first electric contact is arranged on a sleeve in which a pivoting bracket is disposed. A second electric contact is positioned at said bracket so that the latter contacts the first electric contact upon pivoting into a position in which it encompasses a mounting anchor fixed to the vehicle.

SUMMARY OF THE INVENTION

The present invention is based on the finding that child safety seat recognition can be reasonable under a different aspect, i.e. in particular in connection with belt retractors which in a case of restraint with a blocked belt reel allow an adjustable belt force limitation. Such generic belt retractor comprising an adaptive force limiter is illustrated, for example, in DE 10 2007 026 128 A1. This known force limiter is based on the consideration that the unwound webbing length is representative of the size and the weight of a vehicle occupant. In the case of crash, in dependence on the unwound webbing length the force limiter therefore is engaged into a force limiting position at different points in time by a switching operation. Thus force limitation which is optimally adapted to the vehicle occupant is possible.

From DE 10 2008 063 639 A1 a different generic belt retractor is known in which the change-over between two differently high force limiting levels is carried out by a pyrotechnical switch element. Different parameters can be used for driving the switch element, viz. the mass of the occupant seated on the corresponding seat, the contour of the seat indentation. For this purpose, seat sensor mats known per se are used, for example. Also the respective seat adjusting position or the unwound webbing length can be used as parameters for driving the switch element. It is the object of the invention to enable the force limiting operation to be adjusted to a possibly installed child safety seat in a belt retractor.

This object is achieved by a belt retractor comprising the features of claim 1. Advantageous and expedient configurations of the belt retractors according to the invention are stated in the pertinent subclaims.

The belt retractor according to the invention for a vehicle seat belt comprises a rotatably supported belt reel from which webbing can be unwound, a force limiting means which permits controlled webbing extension in the webbing extension direction in a force limiting phase when the belt reel is blocked and a particular force threshold is exceeded, and a change-over device for performing a change-over operation before and/or during the force limiting phase in which it is changed from a first force level to a second force level. In accordance with the invention, the change-over device includes a control means adapted to trigger or inhibit the change-over operation at least in response to the recognition of an installed child safety seat.

The invention permits for the first time to duly take the presence of a child safety seat into account when selecting the force level in the force limiting phase in belt retractors comprising an adaptive force limiter. This is important, as it was found that, when particular child safety seats without the child safety seat recognition according to the invention are used, a non-optimal force level may be selected. Especially large child safety seats require a relatively large webbing extension to fasten the seat belt of a child seated on the child safety seat. In these cases the webbing extension may be within a range corresponding to the webbing extension of a tall or heavy adult represented by a so called 95% hybrid III type dummy in the development of vehicle occupant protection devices. In the case of the belt retractor known from DE 10 2007 026 128 A1 such large webbing extension would always result in the fact that the change-over device adjusts a high force level for a tail or heavy adult, although such high force level is not required for a child. In the belt retractor according to the invention, on the other hand, it can be distinguished between an adult and a child seated on a child safety seat so that an optimum adjustment of the force level can be ensured in each case.

The change-over device comprising the control means basically can also be configured so that the change-over operation is triggered or inhibited solely in response to the recognition of an installed child safety seat, i.e. independently of further criteria. The belt retractor according to the invention in accordance with the foregoing remarks is of special advantage, however, when it comprises a change-over device adapted to trigger or inhibit the change-over operation additionally in response to the unwound webbing length. The recognition or non-recognition of a child safety seat in this case serves, apart from the unwound webbing length, as further input parameter for the decision on the optimum force level.

In accordance with a preferred embodiment of the belt retractor according to the invention, the control means "overrules" a decision on triggering and/or inhibiting a change-over operation which is solely based on the unwound webbing length as input parameter. The control means is designed for this purpose so that—at least at the beginning of a force limiting phase—upon recognition of an installed child safety seat it (initially) triggers and/or inhibits a change-over operation irrespective of the unwound webbing length.

For providing an optionally engageable or disengageable force limitation for changing the force level, the change-over device according to a preferred embodiment includes a engaging mechanism having a switch lever by which the engagement of a force limiting element, especially a cutting member, in a force limiting position can be triggered or inhibited. It has to be noted in this context that the switch lever is not provided for simple change-over (engaging or disengaging an additional force), but is understood to be an inhibiting and release means that can admit the engagement of the force limiting element into the force limiting position (engagement may but need not necessarily take place) or inhibit the same (engagement is inhibited in any case).

The invention also provides a vehicle occupant protection device comprising a belt retractor as described in the foregoing. The vehicle occupant protection device according to the invention moreover comprises a device for recognizing an installed child safety seat which is coupled to the control means of the belt retractor.

The recognition of an installed child safety seat can be transmitted mechanically and/or electrically to the control means. A preferred mechanical solution provides that a Bowden cable is coupled, on the one hand, to the switch lever of the engaging mechanism and, on the other hand, to a fastening position for the child safety seat. When installing the child safety seat, the Bowden cable ensures mechanical actuation or urging of the switch lever into a predetermined position.

The information about the installation of a child safety seat can be electrically transmitted by a switch which upon installation of the child safety seat changes its switching position and is part of an electric circuit for driving an actuator coupled to the switch lever of the engaging mechanism.

A different possible electrical version is based on a transponder system by which the recognition of an installed child safety seat is transmitted to the control means.

Preferably, in the latter configuration a radio transmitter is arranged on the child safety seat for outputting a characteristic signal when the child safety seat is installed. A receiver adapted to the radio transmitter drives an actuator coupled to the switch lever of the control mechanism upon receipt of the signal.

BRIEF DESCRIPTION OF THE DRAWINGS

Further features and advantages of the invention are resulting from the following description and from the enclosed drawings which are referred to and in which.

DESCRIPTION OF EMBODIMENT

Figure 1:
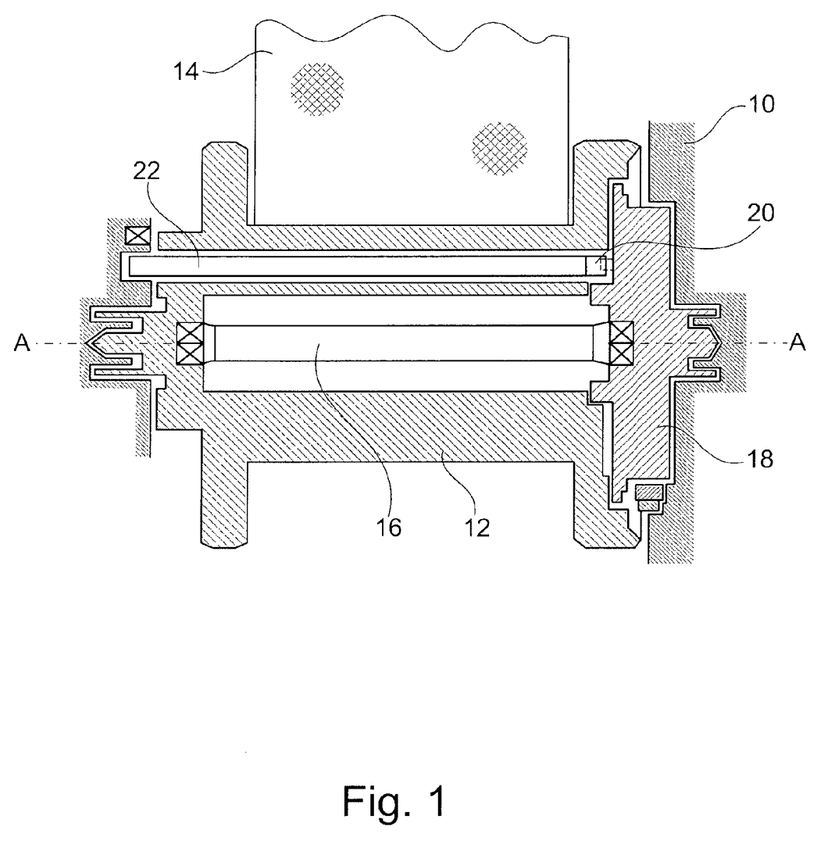
FIG. 1 shows a sectional view of a known belt retractor.

By way of example, the following description of an embodiment of the invention is based on a belt retractor comprising an adaptive force limiter as illustrated in FIG. 1 and described in DE 10 2007 026 128 A1. Regarding the basic structure, said document is referred to.

A belt reel 12 which is rotatably supported in a frame 10 and from which belt webbing 14 can be unwound is coupled to a disk 18 in a rotationally fixed manner by means of a torsion rod 16. If in the case of crash, when the belt reel 12 is blocked, the webbing extension force transmitted by the forward displacement of the vehicle occupant via the webbing 14 to the belt reel 12 exceeds the torsional resistance moment of the torsion rod 16, the torsion rod 16 is twisted and the belt reel 12 rotates relative to the disk 18.

It is essential to the function of the force limiter that during force limitation it can be changed over from the first force level defined by the twisting of the torsion rod 16 to a higher force level by means of a change-over device.

Figure 2:
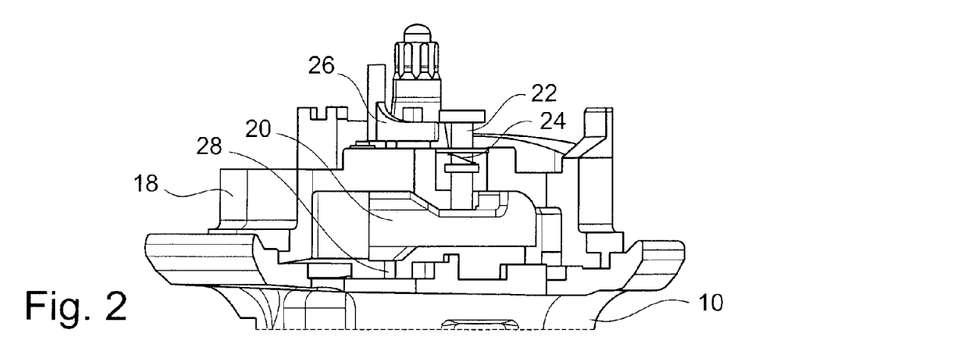
FIG. 2 shows a side view rotated about 90° vis-à-vis FIG. 1 of part of a force limiter of a belt retractor according to the invention in an initial state.
Figure 2A:
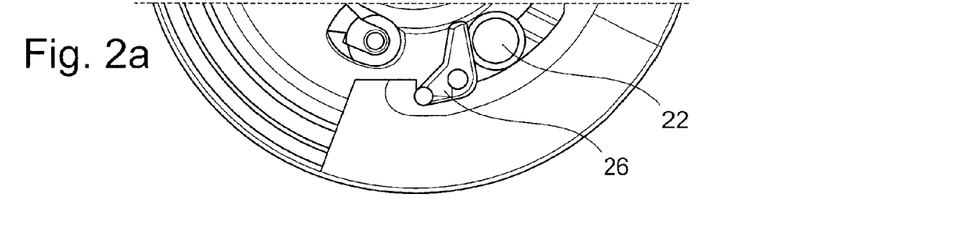
FIG. 2a shows an end side view of the force limiter of FIG. 2 in the initial state.

For this purpose, an additional force limiting element can be provided, as illustrated in FIGS. 2 and 2a, in the form of a cutting member 20 arranged on a control pin 22. The control pin 22 can be adjusted together with the cutting member 20 by an engaging mechanism from a home position into a force limiting position. In the home position the control pin 22 is axially biased in the direction of the belt reel 12 by a spring element 24, but it is secured by a switch lever 26. The control pin 22 can be released by pivoting the switch lever 26.

Figure 3:
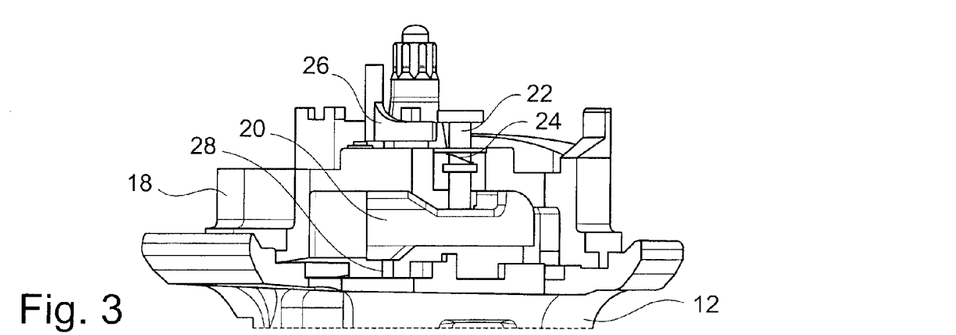
FIG. 3 shows the part of the force limiter in the view according to FIG. 2 during a change-over operation.
Figure 3A:
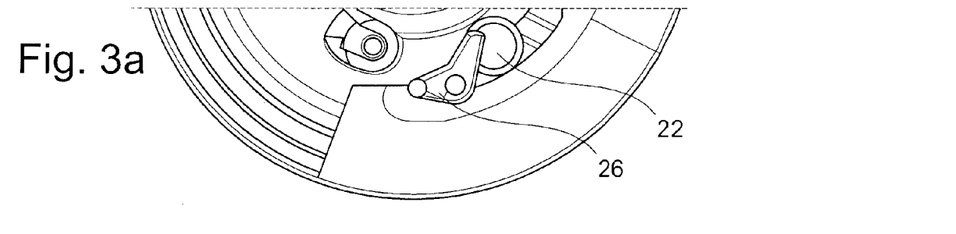
FIG. 3a shows an end face view of the force limiter of FIG. 2 during the change-over operation.

In FIGS. 3 and 3a a situation is illustrated in which the control pin 22 is no longer held by the switch lever 26 so that the cutting member 20 initially supported on an axial projection 28 of the belt reel 12 is axially moved into the force limiting position after little rotation of the belt reel 12 relative to the disk 18. In the force limiting position the cutting member 20 axially protrudes from the end face of the disk 18 facing the belt reel 12 and may cut material of the belt reel 12 upon rotation of the belt reel 12 relative to the disk 18.

Also an inverse arrangement is possible in conformity with the configuration according to FIG. 1 in which in the force limiting position the cutting member 20 cuts material of the disk 18.

The engaging mechanism engages the cutting member 20 in response to the unwound webbing length into the force limiting position. That is to say that depending on the size and weight of a vehicle occupant the cutting member 20 is engaged at different points in time or not at all. Different embodiments of the control mechanism are known from DE 10 2007 026 128 A1, especially those in which engagement of the cutting member 20 into the force limiting position takes place after extension of a predetermined webbing length.

Figure 4:
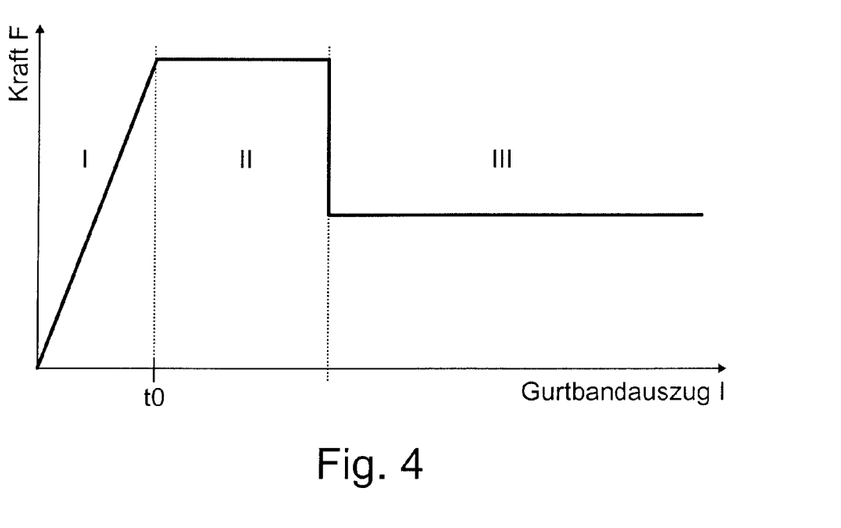
FIG. 4 shows a first characteristic curve of the force limiter of FIG. 2.

In the case of a taller and/or heavier vehicle occupant, corresponding to a 95% hybrid III type dummy as it is called, preferably the first characteristic curve of the belt force F shown in FIG. 4 is resulting over the unwound webbing length l, wherein the length $l_0$ marks the beginning of the actual force limiting phase. The cutting member 20 is engaged—after an initial webbing extension with a small increasing force due to the webbing elongation and the film reel effect (range I)—already at the beginning of force limitation so that the force limitation is obtained both by the cutting of the cutting member 20 and by the twisting of the torsion rod 16 (range II). After rotation of the belt reel 12 about 360° a force limitation is obtained by torsion only, as the cutting member 20 has cut a closed annular groove into the disk 18 and is not able to cut any more material (range III). The force level in this partial phase is definitely lower.

Figure 5:
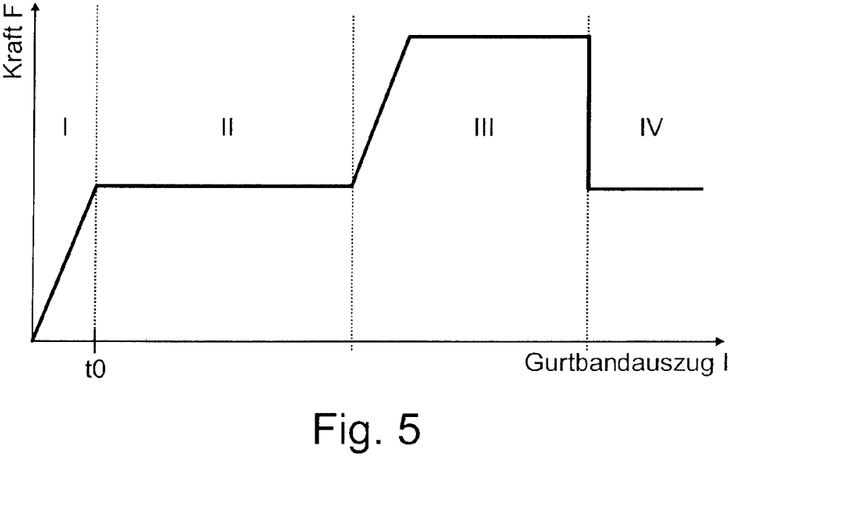
FIG. 5 shows a second characteristic curve of the force limiter of FIG. 2.

The characteristic curve shown in FIG. 5 is preferably resulting in the case of a smaller and/or lighter vehicle occupant corresponding to a 50% or 5% hybrid III type dummy as it is called. The initial webbing extension in the case of a small increasing force due to the webbing elongation and the film reel effect (range I) is smaller than in the case of a taller and/or heavier vehicle occupant. After that, again the force limitation is started which initially takes place on a lower force level, however, as it is only based on torsion (range II). The cutting member 20 is engaged into the force limiting position only after reaching the predetermined unwound webbing length. Then, in the further course of the relative rotation between the belt reel 12 and the disk 18, force limitation takes place on a higher force level by cutting and torsion (range III). After rotation of the belt reel 12 about 360° the cutting operation is completed and force limitation is obtained only by torsion on the lower force level (range IV).

Both in the case of a taller and/or heavier and a smaller and/or lighter vehicle occupant the trace of the characteristic curve can be realized in various manners in the range in which the force is limited also by means of material cutting. In this way, a varying cutting width and/or cutting depth can result in a progressive or degressive trace.

Apart from the unwound webbing length, the recognition of an installed child safety seat is a further criterion of whether and, possibly, when change-over between the force levels takes place. For this, a device for recognizing an installed child safety seat coupled to the change-over device is provided. When the device recognizes an installed child safety seat, this information is included in the decision whether or not in the force limiting phase (at the beginning or in the further course) change-over to a higher or lower force level is to take place.

This decision is mechanically realized with the aid of a control means adapted to trigger or inhibit the change-over operation at least in response to the recognition of an installed child safety seat. In the case of the afore-described force limiter the control means is designed so that in an event in which a large length of webbing which lies within the range of the lengths usual for a tall and/or heavy vehicle occupant has been unwound but is due to the installation of a child safety seat, a change-over to the higher force level is inhibited at the beginning of the force limiting phase. The control means in this case so-to-speak "overrules" a change-over of the change-over device based solely on the unwound webbing length. Only when a predetermined larger webbing extension length has been reached, it is changed to the higher force level. The characteristic curve shown in FIG. 5 is resulting. Without the recognition device the characteristic curve would correspond to that of FIG. 4.

The recognition of the installation of a child safety seat, especially with Isofix mounting, can be transmitted mechanically and/or electrically (wired or wirelessly) to the control means and can be evaluated. A partly electrical transmission is possible as well.

Figure 6:
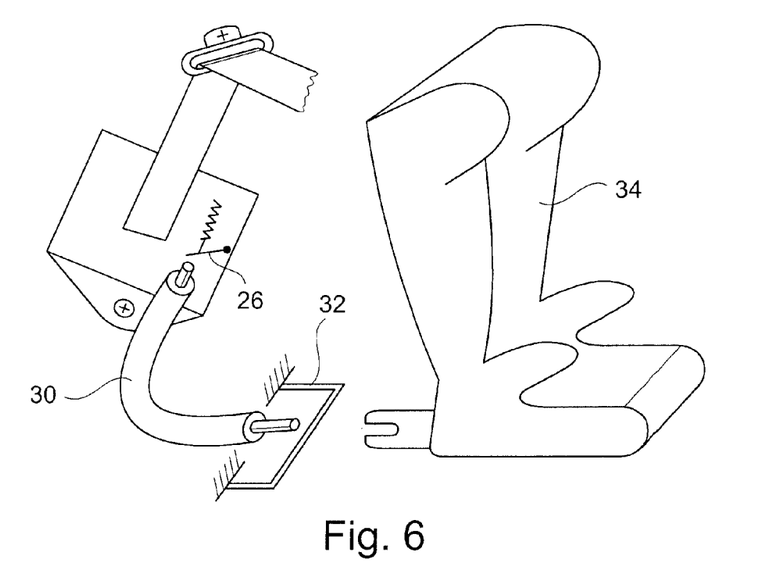
FIG. 6 is a schematic representation of a first embodiment according to the invention comprising mechanical child safety seat recognition when the child safety seat is not locked.
Figure 7:
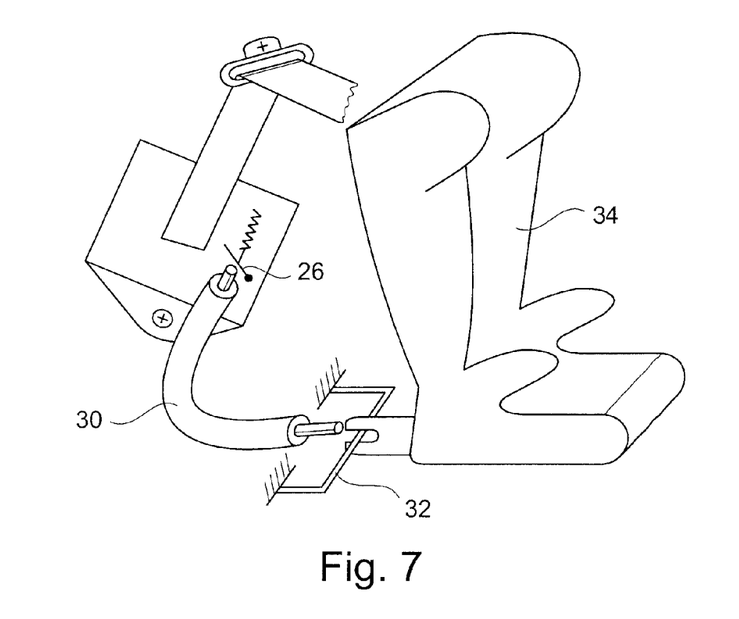
FIG. 7 shows the embodiment of FIG. 6 when the child safety seat is locked.

FIGS. 6 and 7 schematically show a mechanical solution. A Bowden cable 30 is arranged, on the one hand, on the switch lever 26 of the engaging mechanism and, on the other hand, on a mounting position 32 for a child safety seat 34 so that when the child safety seat 34 is installed the Bowden cable 30 exerts a force upon the switch lever 26. More exactly speaking, the Bowden cable 30 forces the switch lever 26 out of a position in which it allows the control pin 22 and the cutting member 20 to move into the force limiting position (FIG. 6) into a securing position in which the switch lever 26 inhibits such change-over operation (FIG. 7).

Figure 8:
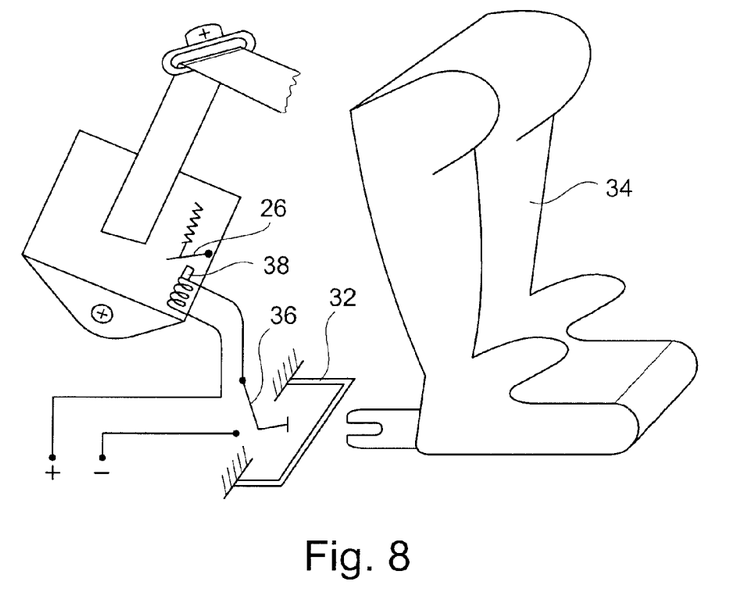
FIG. 8 is a schematic representation of a second embodiment according to the invention comprising an electric child safety seat recognition when the child safety seat is not locked.
Figure 9:
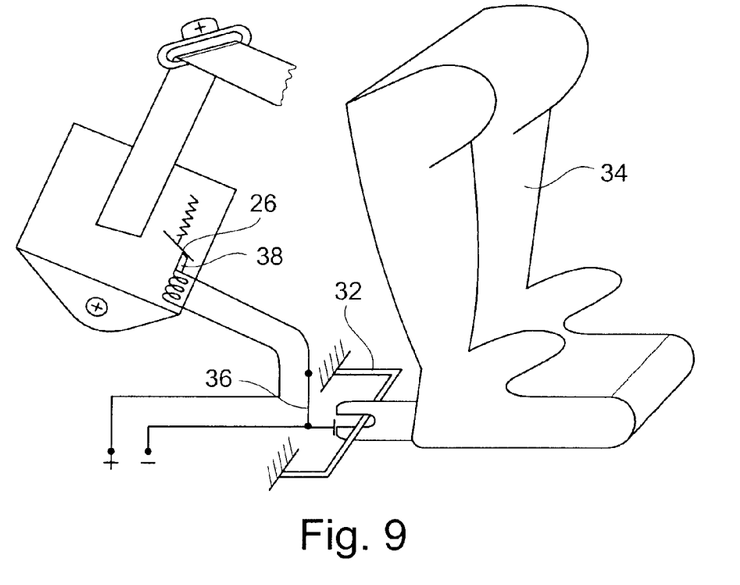
FIG. 9 shows the embodiment of FIG. 8 when the child safety seat is locked.

FIGS. 8 and 9 schematically show an electric configuration comprising a switch 36 which changes its switching position upon installation of the child safety seat 34. The switch 36 is part of an electric circuit for driving an actuator 38 which, depending on the position of the switch 36, admits a change-over operation of the force limiter (FIG. 8) or inhibits a change-over operation (FIG. 9). For this purpose, the actuator 38 is appropriately coupled to the switch lever 26.

Figure 10:
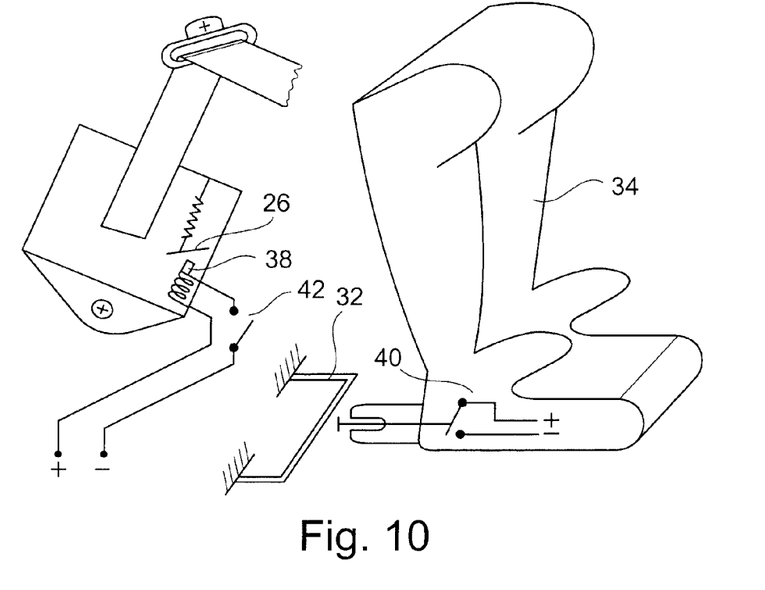
FIG. 10 is a schematic representation of a third embodiment according to the invention comprising transponder-based child safety seat recognition when the child safety seat is not locked.
Figure 11:
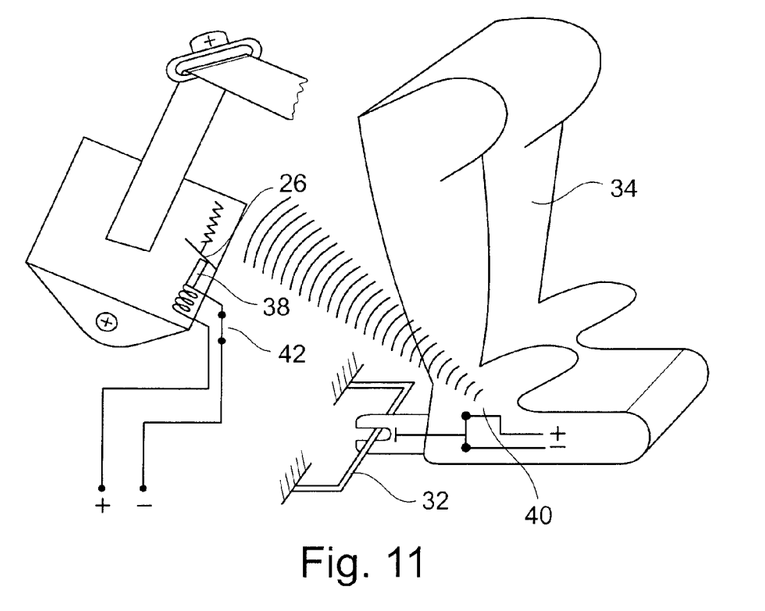
FIG. 11 shows the embodiment of FIG. 10 when the child safety seat is locked.

A configuration based on a wireless transponder system is schematically illustrated in FIGS. 10 and 11. The installation of the child safety seat 34 automatically leads to activation of a radio transmitter 40 arranged on the child safety seat which outputs a characteristic signal. As soon as a receiver 42 adapted to the radio transmitter 40 receives the signal, the actuator 38 coupled to the switch lever 26 is driven so that a change-over operation of the force limiter is inhibited (FIG. 11). Otherwise a change-over operation is admitted (FIG. 10).

In general, also an embodiment inverse with respect to the change-over operation is possible in which by the control means acting on the switch lever 26—contrary to the foregoing remarks—a change-over operation is triggered, especially from a higher to a lower force level, whereas an unloaded switch lever 26 which is not acted upon admits a change-over operation.

The adjusting mechanism can also be configured so that it adjusts the force limiting element (cutting member 20) into the force limiting position only in response to the child safety seat recognition alone, i.e. independently of the unwound webbing length.

The afore-described belt retractor comprising the special force limiter is suited both for the front seats and for the back seats of a vehicle.

LIST OF REFERENCE NUMERALS

10 Frame
12 belt reel
14 webbing
16 torsion rod 18 disk
20 cutting member
22 control pin
24 spring element
26 switch lever
28 projection
30 Bowden cable
32 mounting position
34 child safety seat
36 switch
38 actuator
40 radio transmitter
42 receiver

The invention claimed is:

1. A belt retractor for a vehicle seat belt, comprising:
   a rotatably supported belt reel (12) from which webbing (14) can be unwound,
   a force limiting means which in a force limiting phase permits controlled webbing extension in the webbing extension direction when the belt reel (12) is blocked and a particular force threshold is exceeded, and
   a change-over device for carrying out a change-over operation before and/or during the force limiting phase for changing from a first force level to a second force level in response to the unwound webbing length,
   wherein the change-over device includes a control means adapted to trigger or inhibit the change-over operation in response to the recognition of an installed child safety seat (34), and
   wherein the change-over operation in response to the recognition of an installed child safety seat (34) overrules the change-over operation in response to the unwound webbing length.

2. The belt retractor according to claim 1, wherein the change-over device includes an engaging mechanism having a switch lever (26) by which the engagement of a force limiting element, especially a cutting member (20), into a force limiting position can be triggered or inhibited.

3. A vehicle occupant protection device comprising a belt retractor according to claim 1, wherein a device for recognizing an installed child safety seat (34) is coupled to the control means of the belt retractor.

4. The vehicle occupant protection device according to claim 3, wherein the recognition of an installed child safety seat (34) is mechanically transmitted to the control means.

5. The vehicle occupant protection device according to claim 4, comprising a belt retractor wherein a Bowden cable (30) is coupled, on the one hand, to the switch lever (26) of the engaging mechanism and, on the other hand, to a mounting position (32) for the child safety seat (34).

6. The vehicle occupant protection device according to claim 3, wherein the recognition of an installed child safety seat (34) is electrically transmitted to the control means.

7. The vehicle occupant protection device according to claim 6, wherein an actuator (38) is coupled to the switch lever (36) and wherein an electric circuit for driving the actuator (38) by a switch (36) changes its switching position upon installation of the child safety seat (34).

8. The vehicle occupant protection device according to claim 3, wherein the recognition of an installed child safety seat (34) is transmitted to the control means with the aid of a transponder system.

9. The vehicle occupant protection device according to claim 8, wherein a radio transmitter (40) is arranged on the child safety seat (34) which upon installation of the child safety seat (34) outputs a characteristic signal and wherein a receiver (42) is adapted to the radio transmitter (40) which upon receipt of the signal drives an actuator (38) coupled to the switch lever (26).

* * * * *